(12) United States Patent
Pan

(10) Patent No.: US 10,254,009 B2
(45) Date of Patent: Apr. 9, 2019

(54) SMALL THERMOSTATIC ELECTRIC STORAGE WATER HEATER FOR WATER SUPPLY TERMINAL

(71) Applicant: Zhaokeng Pan, Foshan (CN)

(72) Inventor: Zhaokeng Pan, Foshan (CN)

( * ) Notice: Subject to any disclaimer, the term of this patent is extended or adjusted under 35 U.S.C. 154(b) by 0 days.

(21) Appl. No.: 15/746,331

(22) PCT Filed: Jul. 8, 2016

(86) PCT No.: PCT/CN2016/089362
§ 371 (c)(1),
(2) Date: Jan. 19, 2018

(87) PCT Pub. No.: WO2017/012479
PCT Pub. Date: Jan. 26, 2017

(65) Prior Publication Data
US 2018/0172315 A1    Jun. 21, 2018

(30) Foreign Application Priority Data

Jul. 20, 2015   (CN) .......................... 2015 1 0426174

(51) Int. Cl.
*F24H 9/12*      (2006.01)
*F24H 9/20*      (2006.01)
(Continued)

(52) U.S. Cl.
CPC ........... *F24H 9/2021* (2013.01); *F24H 9/124* (2013.01); *F24H 9/20* (2013.01); *G05D 23/1858* (2013.01);
(Continued)

(58) Field of Classification Search
CPC ............................... F24H 9/2021; F24H 9/124
See application file for complete search history.

(56) References Cited

U.S. PATENT DOCUMENTS

| | | | | |
|---|---|---|---|---|
| 1,555,338 A | * | 9/1925 | Vaughan | F24D 17/00 236/25 R |
| 2,969,451 A | * | 1/1961 | Logan | F24D 17/00 122/13.3 |
| 4,680,446 A | * | 7/1987 | Post | F24D 17/00 122/13.3 |
| 5,872,891 A | * | 2/1999 | Son | F24D 17/0031 126/344 |

(Continued)

FOREIGN PATENT DOCUMENTS

| | | |
|---|---|---|
| CN | 101893114 B | 9/2011 |
| CN | 202253943 U | 5/2012 |
| CN | 202382312 U | 8/2012 |
| CN | 104949325 A | 9/2015 |

OTHER PUBLICATIONS

International Search Report for application No. PCT/CN2016/089362 dated Oct. 10, 2016; 4 pages.

*Primary Examiner* — Nathaniel Herzfeld
(74) *Attorney, Agent, or Firm* — Cantor Colburn LLP

(57) ABSTRACT

Disclosed is a thermostatic, electric storage, water heater for a water supply terminal, which mainly consists of a water storage tank (2), a heating pipe (3), a three-way water valve (16), an electrical control three-way water valve (11), a thermostatic water valve (9) for mixing hot and cold water, and a controller (13), wherein a horizontal end of the three-way water valve (16) is connected to a water inlet pipe of a hot water source, and a lower end thereof is connected to a second water inlet (17) of the electrical control three-way water valve (11). A fifth water inlet (4) on a lower end of the electrical control three-way water valve (11) is connected to a tap-water pipe, and a horizontal end thereof is connected to a third water inlet (12) of the thermostatic water valve (9) for mixing hot and cold water. Temperature signals and water flow signals from the heating pipe (3), the three-way water valve (16) and a water flow sensor (14)

(Continued)

provided inside the thermostatic water valve (9) for mixing hot and cold water are transmitted to the controller (13). The electric water heater can quickly obtain continuous and stable constant-temperature hot water.

6 Claims, 2 Drawing Sheets

(51) Int. Cl.
  *G05D 23/185* (2006.01)
  *G05D 23/19* (2006.01)
  *F24H 1/20* (2006.01)
(52) U.S. Cl.
  CPC ........... *G05D 23/1925* (2013.01); *F24H 1/20* (2013.01); *F24H 1/201* (2013.01)

(56) References Cited

U.S. PATENT DOCUMENTS

| | | | |
|---|---|---|---|
| 6,938,581 B2* | 9/2005 | Neeser | F24D 17/00 122/18.5 |
| 7,298,968 B1* | 11/2007 | Boros | F24D 17/00 392/441 |
| 2012/0060827 A1* | 3/2012 | Roetker | F24H 1/145 126/587 |
| 2013/0025546 A1 | 1/2013 | Okamoto et al. | |

* cited by examiner

US 10,254,009 B2

SMALL THERMOSTATIC ELECTRIC STORAGE WATER HEATER FOR WATER SUPPLY TERMINAL

CROSS-REFERENCES TO RELATED APPLICATIONS

This patent application is a 371 of International Application No. PCT/CN2016/089362, filed Jul. 8, 2016 which claims the priority of Chinese Application No. 201510426174.9, filed Jul. 20, 2015, each of which are incorporated herein by reference in their entirety.

TECHNICAL FIELD

The present disclosure relates to an electric water storage heater, and more particularly to a small, thermostatic, electric water storage heater for a water supply terminal.

BACKGROUND

In the prior art, there are various water heating equipment or systems including fast gas water heaters, solar energy water heaters, heat pump water heaters, water storage gas water heaters, electric water heaters and large central heating water systems. The various water heating equipment or systems described above become hot water source of daily hot water. From the hot water source to the water supply terminal, there are inevitably different lengths of hot water pipes. Among them, the cross-sectional area of a hot water pipe with larger inner pipe diameter can reach 3 cm$^2$, that is, the volume of the hot water pipe per meter can reach 0.3 liters. When the length of the hot water pipe reaches 20 m, the volume of the hot water pipe can reach 6 liters. When the water is not used for a long period of time, the water in the hot water pipe becomes cold water. Each time the water is used, the cold water must be completely emptied before hot water reaches. The hot water pipe emptying time may be quite long. Thus, conventional water heating systems may not be convenient, and may waste excessive amounts of water and heat in the process of waiting for hot water and regulating water temperature. Among the various water heating equipment or systems described above, the fast gas water heater differs from other water storage heating equipment or systems in that, each time the system restarts the water supply, initial water flow may not be less than 3 L/min, moreover heating time of about greater than ten (10) seconds may be needed for heating cold water to hot water. That is, water pipe emptying time, in addition to water heating time, is incurred before hot water can be provided. Such hot water systems may be inconvenient relative to other water storage heating equipment or systems.

Another technique for supplying hot water is adding in the hot water supply pipe a backwater pipe from the water supply terminal to the hot water source to form a recirculation loop, which uses a pump as a peripheral device to circulate the water flow in the water pipes, keeping the water flowing through the supply terminal at an elevated temperature all, or most of, the time. If water in the water pipes circulates for extended periods of time, the hot water waiting time may be reduced to nearly zero. Unfortunately, because the actual water use time is much shorter than the waiting time, if the water pump constantly runs, due to the high temperature of water circulated in the pipeline for a long time, a lot of heat energy is wasted. If the method for starting circulating the water in the pump several tens of seconds before each use of water is adopted, waste of the heat and water is reduced as compared with the method for long-term circulation, the waiting time for hot water is increased, causing user inconvenience as well.

On the basis of the above, there is also a solution to automatically adjust water temperature by adopting mechanical or electronic automatic thermostatic water valve at the water supply terminal to mix cold water and hot water to adjust the water temperature. For a hot water storage source, it can achieve the goal that the temperature of water at the water supply terminal is kept constant. However, for a system using a fast gas water heater as a hot water source, when the fast gas water heater is a non-thermostatic type, because the above-mentioned thermostatic water valve is to maintain the water at thermostatic by changing the proportions of the hot water and the cold water while heat load is unchanged in the usage of the non-thermostatic type fast gas water heater, in case that the temperature of water flowing from the thermostatic water valve is higher than a preset temperature, the water flow coming from the fast gas water heater becomes less, the water temperature becomes higher, but the cold water flowing into the thermostatic water valve does not necessarily become more due to the thermostatic water valve itself or the pipelines, causing the temperature of water coming from the thermostatic water valve is increased, and thus the effect to maintain the temperature of water coming from the thermostatic water valve constant may not be achieved. As for the thermostatic fast gas water heater, a thermostatic water valve at the water supply terminal becomes redundant. Even in a water storage hot water supply, a thermostatic water valve at the water supply terminal can only automatically adjust the temperature of water coming from the water heater after the hot water flows to the water supply terminal, and does not solve the problem of long hot water waiting time in the hot water supply system or the heat energy waste in hot water pipeline circulation.

There is also a solution to solve the problem of the hot water waiting of the hot water supply system by adopting a small fast electric water heater or small electric water storage heater at the water supply terminal. When the small fast electric water heater is used for the water supply terminal, no matter whether it is thermostatically controlled or not, at the beginning of water usage, before the hot water from the hot water source reaches the water supply terminal, heat is provided by the small fast electric water heater. The heat load of the electric water heater may be required to reach 10-20 kilowatts so that there is enough hot water before the hot water coming from the hot water source reaches its destination. Such a large electric supply power may be unacceptable to a household power supply facility. When a small electric water storage heater with a small water storage tank capacity (for example, only 5-6 liters) is disposed at the water supply terminal, because the temperature of the water in the water storage tank can be up to 75° C., the water in the water storage tank may be mixed with the unheated water (e.g., city water) into hot water with the temperature which is the same with the preset water outlet temperature for usage by the user. For example, the hot water provided by the hot water source via the water supply pipe directly enters the water inlet terminal of the small electronic water storage heater, pushing the hot water in the water storage tank to be mixed with the unheated water. The flow amount of the hot water provided by the hot water source via the water supply pipe is equal to the hot water flow amount of the small electronic water storage heater. At this time, the temperature of water in the water storage tank is high, so the flow amount of the water flowing from the water storage tank must be small. The flow amount of the water flowing from the water storage tank is small at initial of using the water, and as the temperature of water in the water storage tank decreases, the flow amount of the water flowing from the water storage tank become larger. When using the fast thermostatic gas water heater as the hot water source, it may not be started in the beginning of using the water due to small water flow amount. The following situation may happen regardless of whether a fast thermostatic gas water heater, or another form of hot water source, is adopted to provide hot water. And, after the cold water flowing from the hot water source to the inlet of the water storage tank enters the water storage tank causing the temperature of the water in the water storage tank to drop to near or below the temperature needed by the water supply terminal, and before the host water from the hot water source does not arrive, there is a first-cold-then-hot phenomenon for a period of time. Therefore, it is hard to achieve the goal of proper usage of the hot water in a common small electronic water storage heater at the water supply terminal. Experiments show that, when the inner volume of the water pipe from the hot water source to the small electric water storage heater is about 80% of the inner volume of the water storage tank of the small electric water storage heater, the cold water temperature is below 15° C., and the temperature rise of the water at the outlet needs to be above 30° C., a problem of hot water supply interruption will arise. The worst condition in water supply is that, the temperature of the unheated water (e.g., city water) is about 5° C. and the thermostatic of water in the outlet is 50° C. Of course a solution of increasing the inner volume of the water storage tank of the electronic water storage heater can be adopted, but the inner volume of the water storage tank must be above 20 L in theory. When a thermostatic water is disposed at the water outlet, an ideal hot water supply status can be reached where the water supply terminal can provide continuous thermostatic hot water with the temperature the same as the preset water outlet temperature. However, it is economically meaningless due to large volume and high cost of the electronic water storage heater at the water supply terminal.

SUMMARY

An object of the present disclosure is to provide a small water storage thermostatic electric water heater for a water supply terminal, which is small, whose water storage capacity is small, and which, upon being installed in the water supply terminal of the hot water supply systems with various hot water sources, provides the user continuous thermostatic hot water with the temperature as the preset temperature at the outlet in several seconds.

An technical solution proposed by the present disclosure is a small water storage electric water heater for a water supply terminal comprising a housing, a water storage tank, a three-way water valve, a thermostatic hot-and-cold water mixing valve and a controller which are arranged in the housing, the water storage tank being internally provided with a heating pipe, wherein, an electrically controlled three-way water valve is arranged between the three-way water valve and the thermostatic hot-and-cold water mixing valve, a first temperature sensor is arranged in the heating pipe, a second temperature sensor is arranged in the three-way water valve, a water flow sensor is arranged in a second water outlet of the thermostatic hot-and-cold water mixing valve, an upper terminal of the three-way water valve is connected to a fourth water inlet located at a lower portion of the water storage tank, a lower terminal of the three-way water valve is connected with a second water inlet of the electrically controlled three-way water valve, a horizontal terminal of the three-way water valve is connected with a first water inlet of the hot water source inlet pipe, a lower terminal of the electrically controlled three-way water valve is connected with a fifth water inlet of the external water source pipe, a first water outlet of the horizontal terminal of the electric water three-way water valve is connected with a third water inlet of the thermostatic hot-and-cold water mixing valve, a sixth water inlet of the thermostatic hot-and-cold water mixing valve is connected to a lower terminal of a first water pipe which is vertically disposed, and an upper terminal of the first water pipe is connected to a cavity in an upper portion of the water storage tank, a signal output terminal of the first temperature sensor, a signal output terminal of the second temperature sensor and a signal output terminal of the water flow sensor are respectively connected with three signal input terminals of the controller, three control signal output terminals of the controller are respectively connected with a signal input terminal of the heating pipe, a signal input terminal of the electrically controlled three-way water valve, and a signal input terminal of the thermostatic hot-and-cold water mixing valve.

Volume of the water storage tank is in the range of 3 L-10 L. Electric power of the heating pipe is in the range of 600 w-3 kW. Water outlet temperature of the thermostatic hot-and-cold water mixing valve is in the range of 30° C.–55° C. Temperature of hot water from a first water pipe of the water storage tank or temperature of hot water supplied from a hot water source is higher than preset water outlet temperature of the thermostatic hot-and-cold water mixing valve. When temperature of water flowing from a hot water source to the three-way water valve is far lower than a preset water outlet temperature, the controller outputs a control signal to the electrically controlled three-way water valve, closing the fifth water inlet, and when the temperature of water flowing from a hot water source to the three-way water valve rises to a temperature which is 1° C.-4° C. below the preset water outlet temperature, the controller to outputs a control signal to the electrically controlled three-way water valve, closing the second water inlet of the electrically controlled three-way water valve, wherein switching time between closing the fifth water inlet and closing the second water inlet is in the range of 10 s-60 s.

Before the electric water heater works, the water in the water storage tank is preheated to about 75° C. by the heating pipe. When the electric water heater works, the thermostatic hot water flows from the second water outlet of the thermostatic hot-and-cold water mixing valve. At this time, the controller becomes in the working state after receiving the water flow amount signal detected by the water flow amount sensor. The high-temperature water in the water storage tank flows to the sixth water inlet of the thermostatic hot-and-cold water mixing valve. When the temperature of the water flowing into the three-way water valve from the hot water source through the first water inlet is detected by the controller via the second temperature sensor to be far below water preset temperature at the outlet, the electrically controlled three-way water valve close the fifth water inlet, so that a part of the water flowing from the hot water source enters the water storage tank, whose flow amount is equal to the that of high-temperature water flowing from the water storage tank, while the other part of the water flowing from the hot water source enters the third water inlet of the thermostatic hot-and-cold water mixing valve through the electrically controlled three-way water valve, and is mixed with the high temperature water in the thermostatic hot-andcold water mixing valve to be thermostatic hot water with the temperature which is the same with the preset temperature of the water at the outlet. The water flow amount of the above two parts is equal to that flowing from the thermostatic hot-and-cold water mixing valve. When the temperature of the water flowing from the hot water source into the three-way water valve is close to the preset water outlet temperature, the electrically controlled three-way water valve gradually switches from closing the fifth water inlet to closing the second water inlet after 10 seconds to 60 seconds. At this time, a thermostatic hot water mixed with the unheated water (e.g., city water) flowing from the fifth water inlet and the hot water flowing from the water storage tank flows out of the thermostatic hot-and-cold water mixing valve.

It can be seen from the above that, when water is used, as long as the temperature of water flowing from the hot water source into the small water storage electric water heater for a water supply terminal is lower than the preset water temperature in the outlet, the amount of water flowing from the hot water source is equal to the thermostatic water amount flowing from the electric water heater, and the amount of water in the hot water inlet pipe between the hot water source and the electric water heater can be quickly replaced by the hot water flowing from the hot water source, and the hot water can be replenished to the electric water heater in the shortest time. Therefore, even if the volume of the water storage tank of the electric water heater is small, it can fully achieve the notable effect that under different hot water sources and different heating water pipe volumes, when the water is used at the water supply terminal, continuous constant-temperature hot water can be obtained within a few seconds.

Since the water using amount of the electric water heater is generally above 3 L/min when working, each time the water is used, if the temperature of water flowing from the hot water source water inlet pipe is below the preset water outlet temperature, the fifth water inlet is closed, and the amount of the thermostatic hot water flowing from the second water outlet is equal to that of water flowing from the hot water source water inlet pipe. When the hot water source is a water storage electric water heater, the cold water in the hot water source water inlet pipe can rapidly turned into hot water. In addition, for a fast gas water heater, because water flow can trigger providing hot water immediately, as long as the fast gas water heater as the hot water source is thermostatic, even if the thermostatic effect is bad, a thermostatic hot water supply system with notable effects can be achieved by combining the electric water heater with various forms of hot water sources, as the water storage tank in the electric water heater can act as a cushion to the temperature change of water flowing into the water storage tank, and keep the temperature of water flowing from the thermostatic hot-and-cold water mixing valve.

In the process of using the water, because the controller can drive the heating pipe to energize and heat up, the temperature of water in the water storage tank can be slightly increased before the hot water of the hot water source arrives, thereby increasing the equivalent volume of the water storage tank.

In the hot water supply system composed of various hot water sources, the water pressure between the various hot water sources and the unheated water is not necessarily equal. For example, there is a voltage difference of more than 0.5 Mpa between the hot water from a non-pressure-bearing solar energy water heater and the unheated water. The pressure balancing apparatus can work normally when the difference between the unheated water pressure and the hot water source water supply pressure is big. The one-direction flowing character of the electrically controlled three-way water valve can assure that, when the temperature of water in the hot water source water inlet pipe is closed to the preset water outlet temperature, in the procedure of closing switch of the electrically controlled three-way water valve, the conversion time from the water flowing into the third water inlet of the hot and water mixing thermostatic water valve from the hot water source to that of the unheated water is 10 s to 60 s In the conversion process, the two flows do not take the direction to the contrary. In the slow conversion period, because the two flows do not take the direction to the contrary, the temperature of water flowing into the third water inlet of the hot and cold water fixing thermostatic water valve changes smoothly, and the temperature of water flowing from the second water outlet is kept constant.

It can be seen from above, each time the water is used, the high-temperature water in the water storage tank is mixed immediately with the cold water flowing from the hot water source, and flows through the thermostatic hot-and-cold water mixing valve, so that the thermostatic hot water with the same temperature with the preset water outlet temperature can be obtained in a few seconds. The cold water is cold water before the temperature of water flowing from the hot water source water inlet pipe reaches or approaches the preset water outlet temperature. The flow amount of the thermostatic hot water at the outlet is equal to that of the water in the hot water source water inlet pipe, so that the cold water in the hot water source water inlet pipe is emptied as soon as possible and replenished by the hot water provided by the hot water source as soon as possible. Therefore, when the electric water heater is combined with various types of hot water sources to form a hot water supply system, though the volume of the water storage tank is small, as long as the temperature of the hot water provided by the hot water source is higher than the preset temperature at the outlet and the water storage tank has enough water amount at the outlet, stable and continuously flowing thermostatic hot water is assured.

As compared with the prior art, the present disclosure has the following significant effect:

In the thermostatic hot water supply system which is formed by combining the small water storage thermostatic electric water heater for a water supply terminal of the present disclosure with various types of hot water sources, the user can obtain stable and continuous thermostatic hot water with the same temperature as the preset water outlet temperature in a few seconds.

(2) The volume of the water storage tank is small, so the whole machine is small, occupies less space, and is easy to install.

(3) Water is saved, which is extremely convenient for the user, and improves the user's comfort experience.

DETAILED DESCRIPTION

The present disclosure is discussed in detail through the following embodiment.

Figure 1:
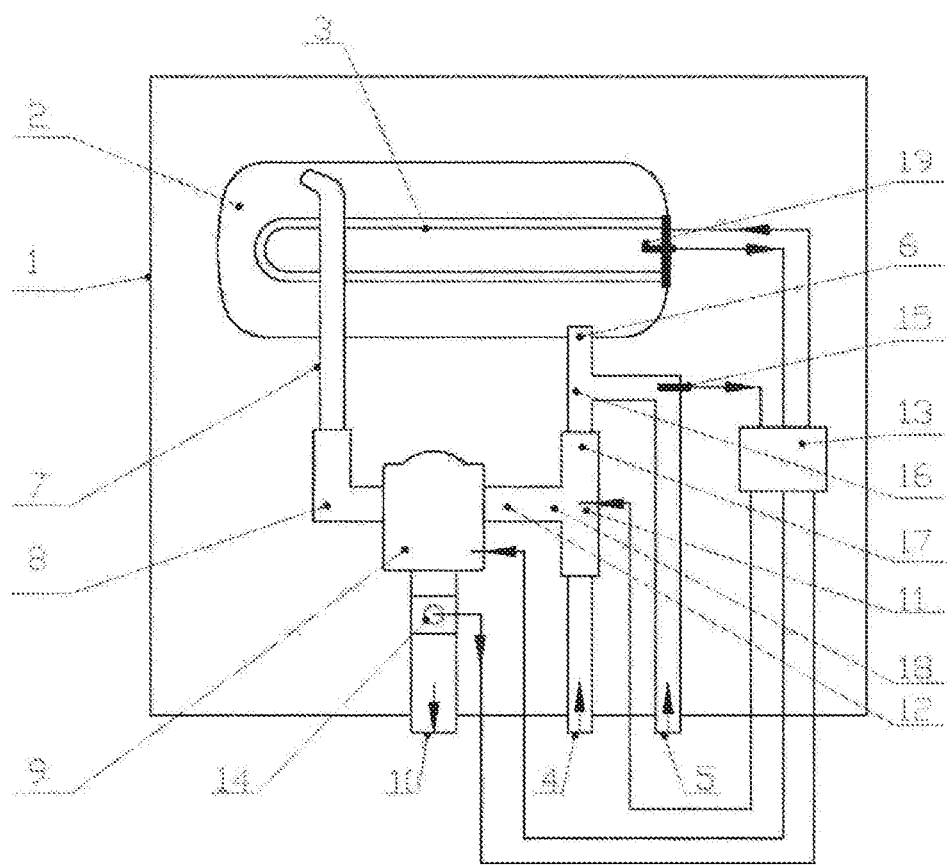
FIG. 1 is a schematic diagram of the structure of the small water storage thermostatic electric water heater for a water supply terminal of the present disclosure.

As shown in FIG. 1, there is provided a small water storage electric water heater for a water supply terminal comprising a housing 1, a water storage tank 2, a three-way water valve 16, an electrically controlled three-way water valve 11 and a thermostatic hot-and-cold water mixing valve 9. The water storage tank 2 is internally provided with a heating pipe 3. A first temperature sensor 19 is arranged in the heating pipe 3. An upper terminal of the three-way water valve 16 is connected with a fourth water inlet 6 at the lower portion of the water storage tank 2. A lower terminal of the three-way water valve 16 is connected with a second water inlet 17 of the electrically controlled three-way water valve 11. A horizontal terminal of the three-way water valve 16 is connected with a first water inlet 5 of the hot water source inlet pipe. A second temperature sensor 15 is inside the three-way water valve 16. The lower terminal of the electrically control three-way water valve 11 is connected with the fifth water inlet 4 of, for example, the external water source pipe of the external device. The first water outlet 18 at the horizontal terminal of the electrically controlled three-way water valve 11 is connected to the third water inlet 12 of the thermostatic hot-and-cold water mixing valve 9. The sixth water inlet 8 of the thermostatic hot-and-cold water mixing valve 9 is connected to a lower terminal of the first water inlet 7 which is vertically disposed. An upper terminal of the first water pipe 7 is connected to a cavity in an upper portion of the water storage tank 2. The thermostatic hot-and-cold water mixing valve 9 is provided with a second water outlet 10. A water flow sensor 14 is disposed in the second water outlet 10. A signal output terminal of the first temperature sensor 19, a signal output terminal of the second temperature sensor 15 and a signal output terminal of the water flow sensor 14 are respectively connected with three signal input terminals of the controller 13. Three control signal output terminals of the controller 13 are respectively connected with a signal input terminal of the heating pipe, a signal input terminal of the electrically controlled three-way water valve, and a signal input terminal of the thermostatic hot-and-cold water mixing valve 9.

The panel of the controller 13 is mounted on the surface of the housing 1. The water outlet temperature and the preset water outlet temperature are displayed on the panel. The preset water outlet temperature can be changed by pressing the keys. The preset water outlet temperature of the thermostatic hot-and-cold water mixing valve is set between 30° C. and 55° C. The volume of the water storage tank 2 is within 3 L-10 L. The electric power of the heating pipe 3 is within 600 W-3 KW. The temperature of the hot water flowing out from the first water pipe 7 or the hot water supplied by the hot water source is required to be higher than the preset water outlet temperature of the thermostatic hot-and-cold water mixing valve. When temperature of water flowing from a hot water source to the three-way water valve 16 via the first water inlet 5 is far lower than a preset water outlet temperature, the controller 13 outputs a control signal to the electrically controlled three-way water valve 11, closing the fifth water inlet 4, and when the temperature of water flowing from a hot water source to the three-way water valve 16 rises to a temperature which is 1° C.-4° C. below the preset water outlet temperature, the controller 13 outputs a control signal to the electrically controlled three-way water valve 11, switching to close the second water inlet 17 of the electrically controlled three-way water valve 11. The switching time between closing the fifth water inlet and closing the second water inlet is in the range of 10 s-60 s.

After the electric water heater works is powered on, the heating pipe 3 is energized to heat up, heating the water in the water storage tank 2 to about 75° C.

When the water is used, the controller 13 starts upon the signal output by the water flow sensor 14. The thermostatic hot-and-cold water mixing valve 9 mixes the high temperature water flowing from the high temperature water outlet 7 of the water storage tank 2 with the cold water flowing from the first water inlet 18 of the electrically controlled three-way water valve 11 to be thermostatic hot water with the same temperature as the preset water outlet temperature for flowing from the second water outlet 10. At this time, if the controller 13 detects, from the second temperature sensor 15 of the three-way water valve 16, that the temperature of the water flowing from the first water inlet 5 of the three-way water valve 16 is 2° C. lower than the preset water outlet temperature, the controller 13 instructs the electronic control three-way water valve 11 to close the fifth water inlet 4. A part of the water flowing from the hot water source via the first water inlet 5 of the three-way water valve enters the water storage tank 2 via the fourth water inlet 6, while the other part of the water enters the third water inlet 12 of the hot and cold mixing thermostatic water valve 9 via the three-way water valve 16, the second water inlet 17 of the electrically controlled water valve 11. At this time, the hot water source water flow amount is equal to the thermostatic water outlet amount of the electric water heater. By contrast, if there is no electrically controlled three-way water valve 16, the water flowing from the hot water source enters the water storage tank 2 alone. At this time, small amount of hot water in the water storage tank 2 can be mixed with the unheated water to produce thermostatic hot water with proper temperature. At this time, the hot water flow amount of the hot water source is equal to that of the hot water. The cold water in the heating pipe between the hot water source and the first water inlet 5 increases to several times much due to the small flow amount when replaced by the hot water. That is, the hot water in the water storage tank 2 is replenished by plenty of cold water and the temperature thereof drops dramatically. If there is no electrically controlled three-way water valves as illustrated in this embodiment, the equivalent volume of the water storage tank 2 will be increased many times, so that the first-cold-then-hot phenomenon occurs before the hot water from the hot water source arrives.

When the hot water flow in the hot water source water inlet pipe gradually replaces cold water in the pipe, the temperature of water flowing into the first water inlet 5 of the three-way water valve gradually increases. When the second temperature sensor 15 detects that the water temperature is close to the preset water temperature, the controller 13 instructs the electronically controlled three-way water valve 11 to switch from closing the fifth water inlet 4 to closing the second water inlet 17. The embodiment begins when the difference between the hot water source water inlet temperature and the preset water outlet temperature is 2° C. It takes about 20 s to switch the three-way water valve 11 from totally closing the fifth water inlet to totally closing the second water inlet 17.

One, non-limiting, example of a thermostatic hot-and-cold water mixing valve is taught in Patent Publication No. CN101893114B, titled: "A Mixing Adjustment Thermostatic Water Valve With Pressure Balance Device," and is incorporated herein in its entirety. Such thermostatic hot-and-cold water mixing valves may have a good thermostatic effect, and may produce thermostatic hot water with the same temperature as the outlet water within several seconds.

Figure 2:
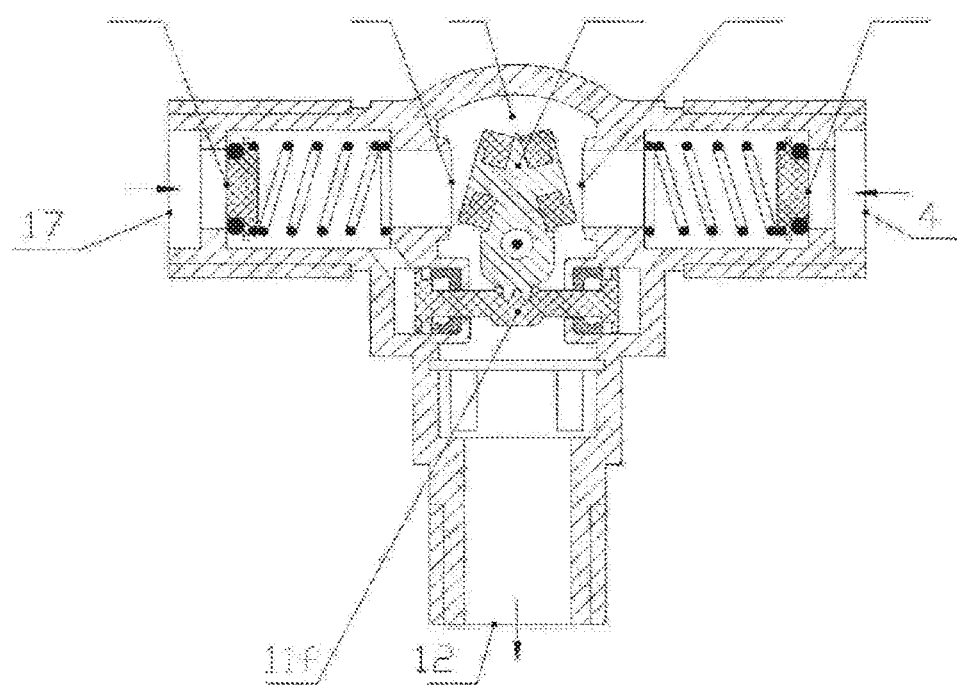
FIG. 2 is a schematic cross-sectional view of the electrically controlled three-way water valve shown in FIG. 1.

As shown in FIG. 2, the second water inlet 17 and the fifth water inlet 4 of the electrically controlled three-way water valve 11 are respectively provided with one-way valves 11a and 11b to prevent the regulating member 11c from making the water flow back and forth due to the pressure difference between the fifth water inlet 4 and the second water inlet 17, in the procedure of switch of the valve inlet or outlet 11d, 11e closing, causing the water temperature of the third water inlet 12 of the thermostatic hot-and-cold water mixing valve 9 to fluctuate repeatedly. The pressure balance device 11f can make the electronically controlled three-way water valve 11 normally perform closing switching operation and achieve good closing effect when the water pressure difference between the fifth water inlet 4 and the second water inlet 17 is more than 0.5 Mpa.

When the controller 13 receives the water flow signal of the water flow sensor 14, if the water flow signal is smaller than the normal value, the controller 13 sends a heating instruction to the heat pipe 3 in the water storage tank 2, ordering the heating pipe 3 to heat up at once, even if the temperature of the water in the water storage tank 2 has reached 75° C., and ordering the heating pipe 3 to stop heating up when the water temperature in the water storage tank 2 reaches 80° C., thus increasing equivalent volume of the water storage tank 2.

In the condition approaching the hot water supply maximum limit, the volume of the water storage tank 2 is selected as 5 liters, the water temperature in the high temperature water storage tank 2 is selected as 75° C., the total volume of the water inlet pipe is selected as 6 liters, the cold water temperature in the water inlet pipe is selected as 5° C., the preset water outlet temperature is selected as 50° C., the theoretical volume of the 50° C. thermostatic hot water formed by mixing the 75° C. hot water in the water storage tank 2 with the 5° C. cold water flowing from the water inlet pipe is 7.8 liters. And, in further consideration of the volume increase effect brought about by the heating pipe 3 heating up forcibly in the procedure of water inlet pipe emptying, as long as the temperature of the hot water supplied later by the hot water source is above the preset water outlet temperature and the hot water supplied later by the hot water source has enough hot energy, the notable effect that the continuous stable thermostatic hot water can be provided in several seconds is achieved.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope of the present disclosure.

What is claimed is:

1. An electric water storage heater for a water supply terminal and in fluid communication with a hot water source inlet pipe and an external water source inlet pipe, the electric water storage heater comprising:
    a housing;
    a water storage tank arranged in the housing;
    a heating pipe disposed in the water storage tank;
    a three-way water valve arranged in the housing, the three-way water valve including a horizontal terminal connected to the hot water source inlet pipe, a lower terminal connected to the external water source inlet pipe via an electrically controlled three-way water valve, and an upper terminal connected to a fourth water inlet located at a lower portion of the water storage tank;
    the electrically controlled three-way water valve arranged between the three-way water valve and the thermostatic hot-and-cold water mixing valve, the electrically controlled three-way water valve including a second water inlet connected with the lower terminal, a fifth water inlet connected to the external water source inlet pipe, and a horizontal terminal having a first water outlet;
    a thermostatic hot-and-cold water mixing valve arranged in the housing, the thermostatic hot-and-cold water mixing valve including a second water outlet, a sixth water inlet, and a third water inlet being connected with the first water outlet;
    a first temperature sensor arranged in the heating pipe, the first temperature sensor including a signal output terminal;
    a second temperature sensor arranged in the three-way water valve, the second temperature sensor including a signal output terminal;
    a water flow sensor arranged in the second water outlet, the water flow sensor including a signal output terminal;
    a controller arranged in the housing, the controller including three signal input terminals connected to the respective signal output terminals of the first temperature sensor, the second temperature sensor, and the water flow sensor, and including three control signal output terminals respectively connected to a signal input terminal of the heating pipe, a signal input terminal of the electrically controlled three-way water valve, and a signal input terminal of the thermostatic hot-and-cold water mixing valve; and
    a first water pipe including a lower terminal vertically disposed and connected to the sixth water inlet, and an upper terminal connected to a cavity in an upper portion of the water storage tank.

2. The electric water storage heater according to claim 1, wherein the water storage tank has a volume in a range of 3 L-10 L.

3. The electric water storage heater according to claim 1, wherein the heating pipe has an electric power in the range of 600 w-3 kW.

4. The electric water storage heater according to claim 1, wherein the thermostatic hot-and-cold water mixing valve has a water outlet temperature in the range of 30° C.-55° C.

5. The electric water storage heater according to claim 1, wherein a temperature of hot water from the first water pipe or a temperature of hot water supplied from the hot water source inlet pipe is higher than a preset water outlet temperature of the thermostatic hot-and-cold water mixing valve.

6. The electric water storage heater according to claim 1, wherein when a temperature of water flowing from the hot water source inlet pipe to the three-way water valve is far lower than a preset water outlet temperature, the controller is configured to output a control signal to the electrically controlled three-way water valve that effects closure of the fifth water inlet, and when the temperature of water flowing from the hot water source inlet pipe to the three-way water valve rises to a temperature which is 1° C.-4° C. below the preset water outlet temperature, the controller is configured to output a control signal to the electrically controlled three-way water valve that effects switching and closure of the second water inlet of the electrically controlled three-way water valve, and wherein a switching time between closing the fifth water inlet and closing the second water inlet is in a range of 10 seconds to 60 seconds.

* * * * *